(12) United States Patent
Tsengas

(10) Patent No.: US 7,104,222 B2
(45) Date of Patent: Sep. 12, 2006

(54) ROLLING PET TOY

(76) Inventor: Steven Tsengas, 1300 East St., Fairport Harbor, OH (US) 44077

( * ) Notice: Subject to any disclaimer, the term of this patent is extended or adjusted under 35 U.S.C. 154(b) by 0 days.

(21) Appl. No.: 10/885,741

(22) Filed: Jul. 8, 2004

(65) Prior Publication Data

US 2004/0237905 A1      Dec. 2, 2004

Related U.S. Application Data

(63) Continuation-in-part of application No. 10/403,385, filed on Apr. 1, 2003, now abandoned.

(51) Int. Cl.
*A01K 29/00* (2006.01)
(52) U.S. Cl. ...................................................... 119/711
(58) Field of Classification Search ................ 119/707, 119/711; 446/289, 437, 448, 456, 457, 458
See application file for complete search history.

(56) References Cited

U.S. PATENT DOCUMENTS

| | | | | |
|---|---|---|---|---|
| 2,104,636 A | * | 1/1938 | Burcham | ...................... 40/411 |
| 4,471,567 A | * | 9/1984 | Martin | ........................ 446/437 |
| 5,009,193 A | * | 4/1991 | Gordon | ....................... 119/711 |
| 6,098,571 A | * | 8/2000 | Axelrod et al. | .............. 119/707 |

* cited by examiner

*Primary Examiner*—Robert P. Swiatek
(74) *Attorney, Agent, or Firm*—John D. Gugliotta; Olen L. York, III

(57) ABSTRACT

A toy is provided that includes a clear plastic ball to be readily movable along a supportive surface, such as the ground. Within the ball there is located a motorized character assembly. The character assembly has an upper housing cover in the form of a mouse or other rodent that would visually trigger an instinctive response in a cat or some breeds of (hunting) dogs. Beneath the upper housing cover is a motor which operates a drive wheel assembly. The drive wheel assembly is to be in continuous contact with the inner surface of the ball. The wheels further are made of soft rubber that does not slide in the internal ball surface, but rather causes the ball to roll and be propelled forward.

8 Claims, 3 Drawing Sheets

ROLLING PET TOY

RELATED APPLICATIONS

This application is a continuation-in-part of prior U.S. application Ser. No. 10/403,385, filed on Apr. 1, 2003.

BACKGROUND OF THE INVENTION

1. Field of the Invention

The present invention relates generally to an amusement device and, more particularly, to an amusement device designed primarily to be employed in conjunction with animals, such as dogs and cats.

2. Description of the Related Art

In practically every pet store, drug store and grocery store there may be purchased a wide variety of toys for either a cat or dog. Different types of balls, bones, toys which squeak, etc. can be purchased. In every case, each of the toys is passive. The only way that any of the toys can become movable is through the toy being thrown by a human being or upon the toy being moved by the animal itself.

It is well known that animals, such as dogs and cats, love to chase anything that moves. It a toy could be constructed which becomes movable when the animal comes to within a few feet of the device, there is no doubt that such a toy would be quite entertaining to a dog or cat.

Numerous examples exists that depict such toys. For instance, U.S. Pat. No. 4,391,224, issued in the name of Adler, discloses an animal amusement device that is activated by a radio transmitter of limited range being carried by the animal. However, a toy made in accordance with this reference is associated with several drawbacks. For example, such toys do not rely on instinctive sensory responses, such as sight or smell, to trigger interest in by a dog or cat. Moreover, such a device is of such complexity as to be expensive to manufacture; so expensive, in fact, as to make such a device unpractical for use with pets.

A search of the prior art did not disclose any patents that read directly on the claims of the instant invention; however, the following references were considered related:

| U.S. Pat. No. | Inventor | Issue Date |
|---|---|---|
| 5,533,920 | Arad et al. | Jul. 9, 1996 |
| 5,533,921 | Wilkdinson | Jul. 9, 1996 |
| 5,476,408 | Hoeting et al. | Dec. 19, 1995 |
| 5,439,408 | Wilkinson | Aug. 8, 1995 |
| 4,391,224 | Adler | Jul. 5, 1983 |
| 4,662,260 | Rumsey | May 5, 1987 |

Consequently, a need has therefore been felt for an improved but less complex mechanism that creates a chasable toy that triggers a play or chase response in a dog or cat.

SUMMARY OF THE INVENTION

It is therefore an object of the present invention to provide an improved amusement device.

It is a feature of the present invention to provide an improved an amusement device designed primarily to be employed in conjunction with animals, such as dogs and cats.

Briefly described according to one embodiment of the present invention, a toy of this invention takes the form of a clear plastic ball to be readily movable along a supportive surface, such as the ground. Within the ball there is located a motorized character assembly. The character assembly has an upper housing cover in the form of a mouse or other rodent that would visually trigger an instinctive response in a cat or some breeds of (hunting) dogs. Beneath the upper housing cover is a motor which operates a drive wheel assembly. The drive wheel assembly is to be in continuous contact with the inner surface of the ball. The wheels further are made of soft rubber that does not slide in the internal ball surface, but rather causes the ball to roll and be propelled forward. When the ball meets an obstacle, the wheels continue turning to cause the ball to be urged in a new direction. In this manner, operation of the motor operates the drive wheel assembly which moves the motor and drive assembly within the device, which in turn cause the device to randomly move across the supportive surface. Also located within the device is an olfactory stimulation means, such as catnip (or beef/food scent), can further be incorporated to provide additional sensory stimulation.

The primary objective of this invention is to construct an animal toy which randomly moves in response to interaction with the pet or contact with an obstacle, thereby freeing the owner from the sometimes onerous and time-consuming duty of entertaining a bored, unhappy pet, and at the same time providing the pet owner with the pleasurable entertainment of watching his active pet. It is the unique utilization of this "chase" instinct in all animals by this device that makes it especially attractive, and useful, as a pet toy.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within the Figures.

Figure 1:
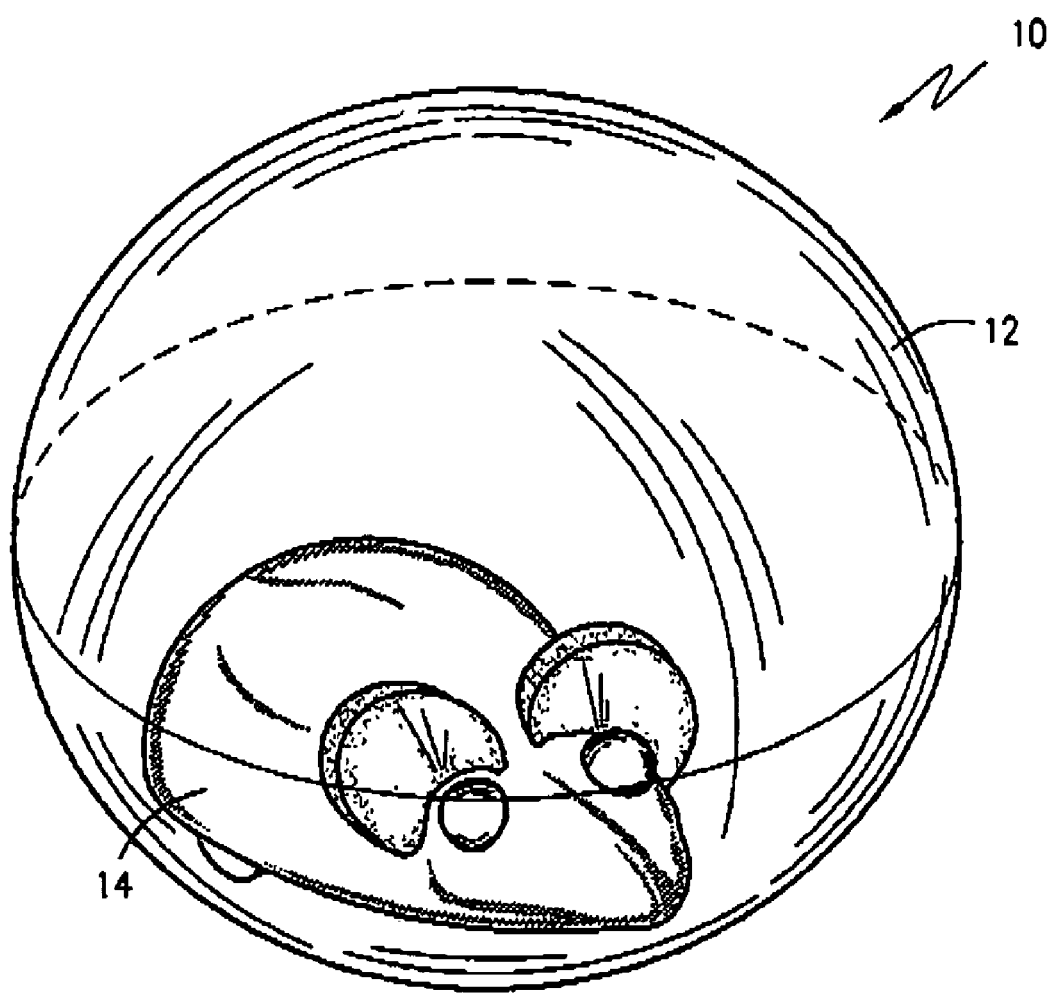
FIG. 1 is a perspective view of a chaseable pet toy according to the preferred embodiment of the present invention.
Figure 2:
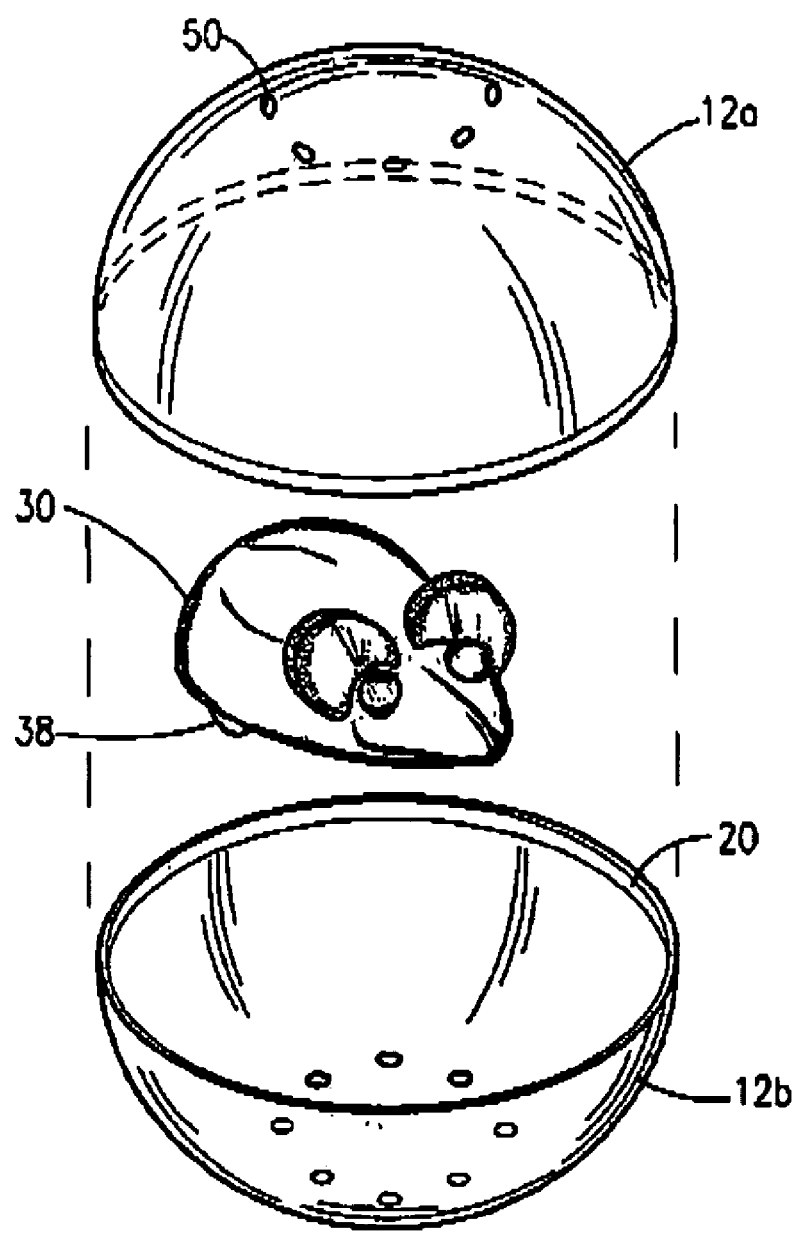
FIG. 2 is an exploded perspective view thereof.
Figure 3:
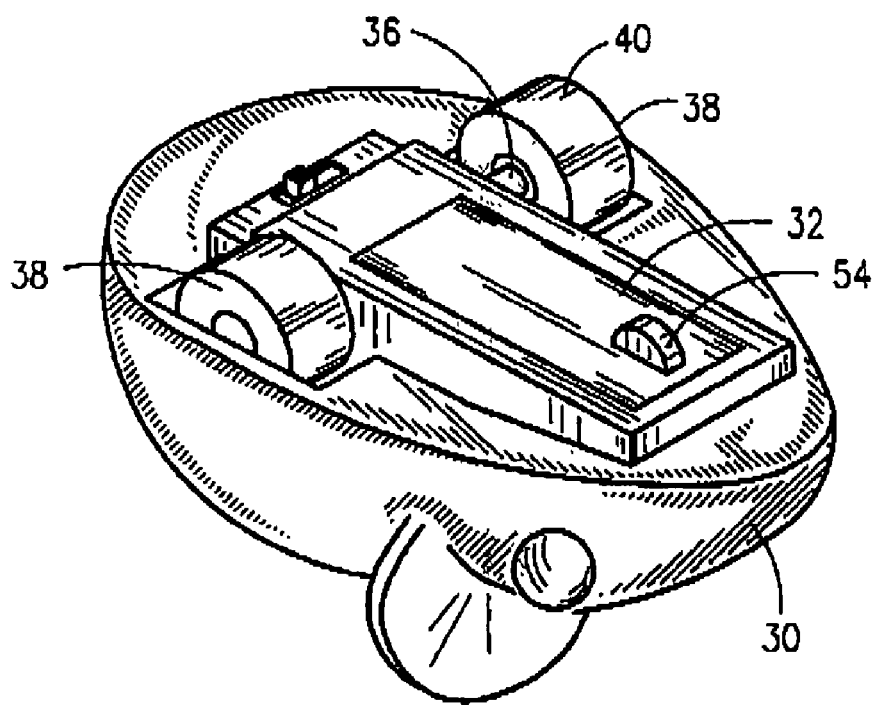
FIG. 3 is a bottom perspective view of a motorized character assembly for use therewith.
Figure 4:
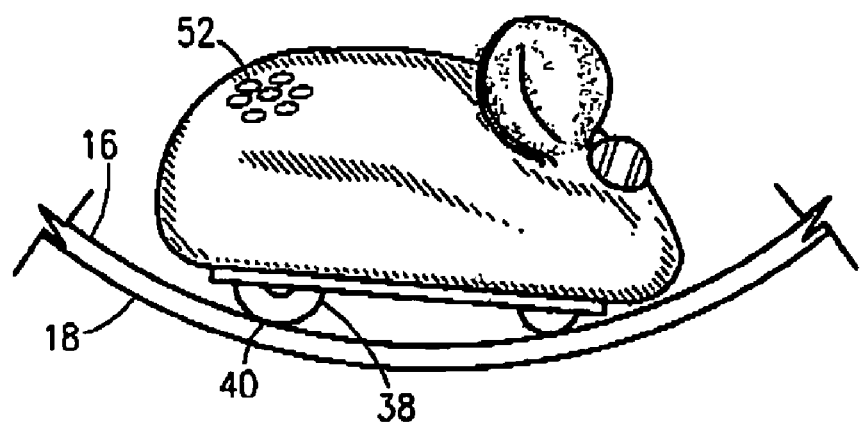
FIG. 4 is a partial side elevation of the motorized character assembly in contact with the inner ball surface.

Referring now to FIG. 1, a rolling pet toy 10 is shown, according to the present invention, in which a clear ball or sphere 12 encases an internal character 14. The ball 12 may be clear or transparent so as to provide visual communication with the internal character 14. The ball 12 may be fabricated from of clear plastic, such as clarified polypropylene, acrylic, polycarbonate, ABS, polystyrene or other functional equivalent. The ball 12 is formed of a first hemisphere 12a and a second hemisphere 12b that are coupled together (such as by snapping together) to form a rigid, hollow sphere with a smooth internal surface 16 and a smooth external surface 18 and concurrently providing an internal space or chamber 20. The external surface 18 is intended to be located upon a supportive surface such that the basic operation of the apparatus of this invention is that ball can be freely urged to roll about the supportive surface.

The internal surface 16 is similarly intended to allow the internal character 14 to freely roll within the surface 16, as will be described in greater detail below. The transparency of the ball allows the internal character 14 to function as a visual attractant for an animal or pet, which will cause the animal to chase, bite or otherwise be entertained by the character 14. However, the animal/pet will not be able to penetrate the ball 12.

In greater detail, the internal character 14 comprises an upper housing cover 30 coupled to a lower housing 32, the coupling accomplished by a variety of means, including interference or fit impingement or threads. Within the lower housing 32 is a motor that operates by electrical energy supplied by a battery to rotate a shaft 36. Attached to the shaft 36 are a pair of driving wheels 38. The driving wheels 38 will normally be constructed of a non-skid surface 40 formed of a frictionally grabbing material, such as rubber or the like. The wheel surfaces 40 are to be in continuous contact with the internal surface (or inner wall) 16 of the space or chamber 20. An additional wheel(s) 54 may be provided opposite the driving wheels 38; The wheel(s) 54 support an end of the character 14, and freely rotates in response to the mobilization of the character 14 resulting from the motor and wheels 38.

It is to be understood that operation of the motor will cause the driving wheels 38 to move upon the internal surface 16 of the wall of the space or chamber 20. This will cause the ball 12 to mobilize or roll upon the supportive surface. It is preferred that such movement be random so that the ball 12 will be inclined to move in any direction.

The upper housing cover 30 is intended to be in a form to give the visual impression of a mouse, rat, or similar rodent of the type that would likely cause a visual attractant to a cat in general or specific breeds of dogs, such as Jack Russell terriers, dachshunds, or the like. The hemispheres 12a and 12b may be decoupled to replace characters with another character(s) for changing the visual attractant, the scented attractant or both.

Although the structure of the present invention has been described in conjunction with domesticated pets, it is considered to be within the scope of this invention to employ the subject matter in toys for children. It is obvious that this is a preferred embodiment of the invention, and that the principle of the entertainment object of the pet may be varied. Various adaptations can be incorporated within the basic operation as disclosed to provide additional attractant(s) or other sensory interaction for a pet. By way of example, and not as a limitation on the scope of the invention, a plurality of penetration orifices 50 can be formed in one or both hemispheres 12a, 12b. This would provide fluid communication between the space or chamber 20 and the outside atmosphere or external environment for communicating a scented attractant to an animal/pet. Enhancement ports or openings 52 may be formed within the housing 30 and/or 32 for communicating a scented attractant (olfactory stimulation means) such as catnip, wild flowers, food scents (including beef/poultry scents), or imitation prey scents, thereby proving additional sensory stimulation.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

What is claimed is:

1. A rolling pet toy comprising:
   a mobile character having a plurality of openings externally communicating an attractant comprising catnip, said character having an upper housing cover coupled to a lower housing, said lower housing having a motor and driving wheels;
   a hollow first hemisphere and a hollow second hemisphere coupled to form a hollow ball housing said character, wherein each one of said hemispheres having a transparent surface visually communicating said character; and
   said hemispheres having orifices externally communicating said attractant to a pet; wherein said transparent surfaces are formed selecting a member from the group consisting of clarified polypropylene, acrylic, polycarbonate, ABS and polystyrene.

2. The rolling pet toy of claim 1, wherein said character moves along an internal surface mobilizing said ball.

3. The rolling pet toy of claim 1, wherein said character provides a visual attractant to said pet.

4. The rolling pet toy of claim 1, wherein said upper housing cover visually communicates a rodent.

5. The rolling pet toy of claim 1, wherein said character further comprises an additional wheel opposite said driving wheels, said additional wheel freely rotatable in response to mobilization of said character.

6. The rolling pet toy of claim 1, wherein said motor is operatively coupled with a battery source supplying electricity thereto.

7. The rolling pet toy of claim 1, wherein said motor couples to a shaft for propelling said wheels.

8. The rolling pet toy of claim 1, wherein said orifices are dimensioned to prevent penetration of said pet's paws.

* * * * *